L. ERHARDT.
TOPPING DEVICE FOR HARVESTERS.
APPLICATION FILED NOV. 9, 1909.

1,009,058.

Patented Nov. 21, 1911.

Witnesses:

Inventor:
Ludwig Erhardt.
by L. K. Böhm,
Attorney.

UNITED STATES PATENT OFFICE.

LUDWIG ERHARDT, OF BERNBURG, GERMANY, ASSIGNOR TO THE FIRM OF W. SIEDERSLEBEN & CO., G. M. B. H., OF BERNBURG, GERMANY.

TOPPING DEVICE FOR HARVESTERS.

1,009,058.  Specification of Letters Patent.  Patented Nov. 21, 1911.

Application filed November 9, 1909. Serial No. 526,966.

*To all whom it may concern:*

Be it known that I, LUDWIG ERHARDT, a citizen of the German Empire, and resident of Bernburg, in the Duchy of Anhalt, German Empire, have invented new and useful Improvements Relating to Topping Devices for Harvesters, of which the following is a specification.

This invention relates to harvesters used for harvesting beets, turnips and the like and more particularly to the devices used for cutting the tops off the beets or the like.

It has already been proposed to provide an automatic adjusting device for adjusting the height of the cutter to suit various beets or the like. Thus the beets or the like do not all project for the same distance out of the ground and the automatic adjusting device adjusts the height of the cutter to suit the various heights to which the beets or the like project out of the ground. In this way only a fixed amount is cut from the top of the beet or the like.

In harvesters it has already been proposed to use comb-like gages for gaging the height of the vegetables to be topped, but in such devices either the intermediate spaces between the comb-plates have been obstructed in some manner or other or alternatively the comb-plates have been arranged at an inclination to the direction of travel of the machine, so that such topping devices have presented the disadvantage that the vegetable foliage, particularly when the latter is luxuriant, is crushed before the vegetables are topped and the foliage is thus rendered of little use for animal purposes; unless special means be provided for cutting away a considerable portion of the foliage before the comb-plates and topping device come into operation.

The present invention relates to an improved construction of such harvesters and consists essentially in providing a comb-like gage in which the comb-plates are provided with entirely unobstructed intermediate spaces, the gage being arranged in the direction parallel to the direction of travel of the machine so that during the operation of the machine the comb-plates can pass through the vegetable foliage without crushing it.

In order that the invention may be more clearly understood, reference is made to the accompanying drawing, which shows somewhat diagrammatically the preferred method of carrying out the invention.

Figure 1:
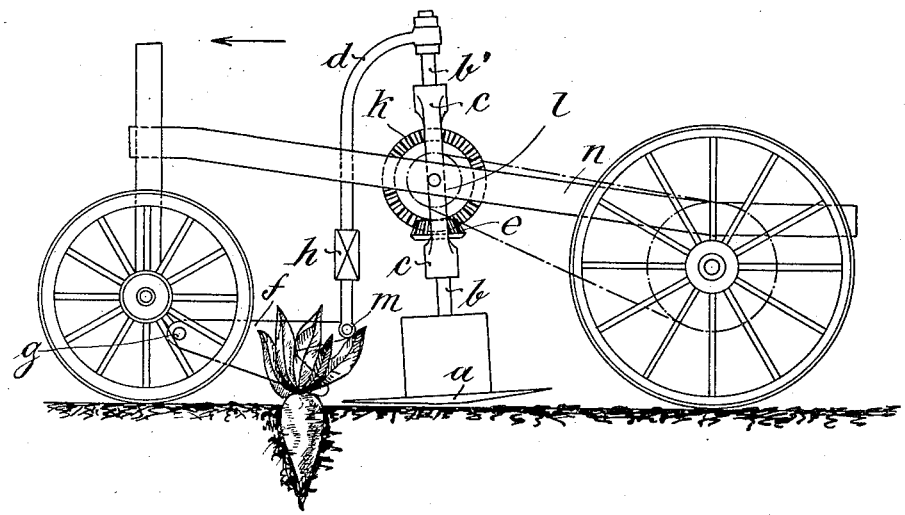
Figure 2:
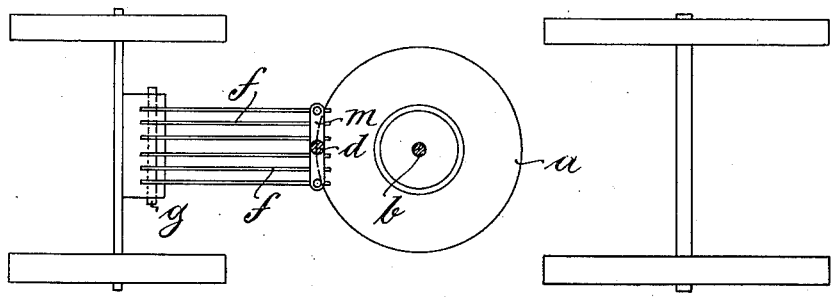

Figure 1 is an elevation of the harvester and Fig. 2 a plan of same.

According to this invention a rotatable cutter $a$ is mounted upon a spindle $b$ upon which is splined a sleeve so that the sleeve and spindle $b$ may rotate together, while admitting of relative axial movement. The spindle is carried in bearings in a stirrup frame $c$ adjustably secured at $l$ on the main frame $n$ of the machine and the sleeve is driven by means of a bevel wheel $e$, secured thereon and gearing with a bevel wheel $k$, driven from one of the axles of the harvester. To the upper end of the spindle $b$ is pivotally attached a bow-shaped arm $d$, the lower end of which is connected to a yoke $m$, which latter is pivotally attached to the upper and forward end of a series of parallel plates $f$ which form a comblike-gage. The plates $f$ are loosely pivoted upon a spindle $g$ carried by the main-frame of the machine. The bow-shaped arm $d$ and yoke $m$ are preferably connected by means of a turn buckle $h$ threaded upon right-and-left-hand screws formed on the meeting parts of the arm $d$ and yoke $m$. By turning the turn buckle $h$ the relative heights of the lower ends of the plates $f$ and the cutter $a$ may therefore be readily altered.

It will be seen that the plates $f$ slope downwardly and rearwardly from the spindle $g$ which is arranged at such a height as not to materially crush or damage the foliage of the vegetables. Further it will be seen that the connection between the comb plates $f$ and the yoke $m$ is also at such a height that no obstruction is offered to the passage of the foliage through the intermediate spaces between the comb plates $f$.

In operation the comb plates $f$ trail over the ground and ride on the beets. With even the thickest tops the comb plates $f$ come to rest on the beet itself owing principally to the fact that the plates $f$ are at their rear ends of substantially the same height as the tops. Further it will be seen that when the plates $f$ rise the cutter $a$ is moved in a straight line and not swung about a pivot so that the planes of the cuts are always parallel.

It will be understood that the harvester is drawn over the ground in the direction of the arrow in Fig. 1. The cutter $a$ is preferably constructed as shown with its lower surface parallel to the ground while its upper surface is inclined in the manner illustrated.

A further and very important advantage of the arrangement of the adjusting comb illustrated is that breakdowns caused by the tops in previous machines are avoided owing to the fact that the tops have ample room and opportunity to pass through the comb.

I claim:

1. In a harvester for beets and the like, a topping device having, in combination with the main frame, a cutter slidably mounted, comb-plates sloping downwardly and rearwardly, said comb plates being arranged in front of the cutter in a direction parallel to the direction of movement of the harvester and being pivoted loosely at their front ends at a height above the tops and being at their rear ends of a height approximately equal to the tops and leaving free intermediate spaces whereby an uninterrupted passage is afforded for the vegetable foliage, and means for transmitting movement from said comb plates to said slidable cutter.

2. In a harvester for beets and the like, a topping device having, in combination with the main frame, a cutter slidably mounted, comb plates sloping downwardly and rearwardly, said comb plates being arranged in front of the cutter in a direction parallel to the direction of movement of the harvester and being pivoted loosely at their front ends at a height above the tops and being at their rear ends of a height approximately equal to the tops and leaving free intermediate spaces whereby an uninterrupted passage is afforded for the vegetable foliage, and a direct connection from the upper part of the rear ends of said comb plates to the slidable cutter.

3. In a harvester for beets and the like, a topping device having, in combination with the main frame, a cutter slidably mounted, comb plates sloping downwardly and rearwardly, said comb plates being arranged in front of the cutter in a direction parallel to the direction of movement of the harvester and being pivoted loosely at their front ends at a height above the tops and being at their rear ends of a height approximately equal to the tops and leaving free intermediate spaces whereby an uninterrupted passage is afforded for the vegetable foliage, a direct connection from the upper part of the rear ends of said comb-plates to the slidable cutter and means in said connection for altering the relative height of said comb-plates and cutter.

4. In a harvester for beets and the like, a topping device comprising in combination, a vertically adjustable rotary cutter carried by the main frame, a comb-like gage in front of the cutter in a direction parallel to the direction of movement of the harvester, said gage comprising a series of spaced vertical plates of approximately triangular shape, each loosely pivoted to the main frame near its forward corner at a height above the tops and having a downwardly and rearwardly inclined edge adapted to ride on the tops, and a connection between the rear upper corners of said plates and the rotary cutter so as to transmit vertical movement thereto.

5. In a harvester for beets and the like, a topping device comprising, in combination, a rotary cutter, a spindle carrying the cutter, a sleeve splined on said spindle, bearings for the spindle mounted on said main frame, a comb-like gage in front of the cutter, in a direction parallel to the direction of movement of the harvester, said gage comprising a series of spaced vertical plates of approximately triangular shape, each loosely pivoted to the main frame near its forward corner at a height above the tops and having a downwardly and rearwardly inclined edge adapted to ride on the tops, and a bow-shaped connecting rod from the upper corners of said plates to the spindle of the rotary cutter so as to transmit vertical movement thereto.

In witness whereof I have hereunto set my hand in the presence of two witnesses.

LUDWIG ERHARDT.

Witnesses:
GOTTFRIED KEIL,
JAMES L. A. BURRELL.

---

Copies of this patent may be obtained for five cents each, by addressing the "Commissioner of Patents, Washington, D. C."